(12) United States Patent
McNeil et al.

(10) Patent No.: US 9,937,694 B2
(45) Date of Patent: Apr. 10, 2018

(54) METHOD FOR MAKING MULTI-PLY FIBROUS STRUCTURES

(71) Applicant: The Procter & Gamble Company, Cincinnati, OH (US)

(72) Inventors: Kevin Benson McNeil, Loveland, OH (US); Patrick John Buschur, Fairfield, OH (US); Andre Mellin, Amberley Village, OH (US); Thomas Timothy Byrne, West Chester, OH (US); Mark Stephen Conroy, Colerain Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 447 days.

(21) Appl. No.: 14/268,182

(22) Filed: May 2, 2014

(65) Prior Publication Data

US 2014/0238596 A1    Aug. 28, 2014

Related U.S. Application Data

(62) Division of application No. 12/468,394, filed on May 19, 2009, now Pat. No. 8,753,737.

(51) Int. Cl.
*B32B 37/30* (2006.01)
*B32B 5/26* (2006.01)
(Continued)

(52) U.S. Cl.
CPC ............... *B32B 37/30* (2013.01); *B32B 5/02* (2013.01); *B32B 5/08* (2013.01); *B32B 5/22* (2013.01); *B32B 5/26* (2013.01); *B32B 7/14* (2013.01); *B32B 29/005* (2013.01); *B32B 29/06* (2013.01); *D21H 27/004* (2013.01); *D21H 27/02* (2013.01); *D21H 27/30* (2013.01); *D21H 27/40* (2013.01); *B32B 2250/20* (2013.01); *B32B 2250/26* (2013.01); *B32B 2262/0223* (2013.01); *B32B 2262/0253* (2013.01); *B32B 2262/0261* (2013.01); *B32B 2262/0276* (2013.01); *B32B 2262/04* (2013.01); *B32B 2262/06* (2013.01); *B32B 2262/12* (2013.01);
(Continued)

(58) Field of Classification Search
CPC ........ D21H 27/02; D21H 27/30; D21H 27/40; D21H 27/004; B32B 37/30
See application file for complete search history.

(56) References Cited

U.S. PATENT DOCUMENTS 2,870,737 A    1/1959    Byrnes
3,414,459 A    12/1968   Wells
(Continued)

FOREIGN PATENT DOCUMENTS

EP    0 096 832 A2    12/1983
EP      338792 B1    3/1994
(Continued)

OTHER PUBLICATIONS

U.S. Appl. No. 14/268,211, filed May 2, 2014, McNeil, et al.
(Continued)

*Primary Examiner* — Donald J Loney
(74) *Attorney, Agent, or Firm* — Andrew J. Mueller

(57) ABSTRACT

Embossed multi-ply fibrous structures and methods for making such embossed multi-ply fibrous structures are provided.

17 Claims, 6 Drawing Sheets

(51) Int. Cl.

| | | |
|---|---|---|
| *D21H 27/00* | (2006.01) | |
| *D21H 27/02* | (2006.01) | |
| *D21H 27/30* | (2006.01) | |
| *D21H 27/40* | (2006.01) | |
| *B32B 5/02* | (2006.01) | |
| *B32B 5/08* | (2006.01) | |
| *B32B 5/22* | (2006.01) | |
| *B32B 7/14* | (2006.01) | |
| *B32B 29/00* | (2006.01) | |
| *B32B 29/06* | (2006.01) | |

(52) U.S. Cl.
CPC ..... *B32B 2307/54* (2013.01); *B32B 2307/718* (2013.01); *B32B 2307/72* (2013.01); *B32B 2555/00* (2013.01); *Y10T 428/15* (2015.01); *Y10T 428/24463* (2015.01); *Y10T 428/24562* (2015.01); *Y10T 428/24612* (2015.01); *Y10T 428/24826* (2015.01)

(56) References Cited

U.S. PATENT DOCUMENTS

| | | | |
|---|---|---|---|
| 3,478,141 A | 11/1969 | Dempsey et al. | |
| 3,556,907 A | 1/1971 | Nystrand | |
| 3,661,680 A | 5/1972 | Gore | |
| 3,672,949 A | 6/1972 | Brown | |
| 3,672,950 A | 6/1972 | Murphy et al. | |
| 3,961,119 A | 6/1976 | Schulz | |
| 4,158,594 A | 6/1979 | Becker et al. | |
| 4,483,728 A | 11/1984 | Bauernfeind | |
| 4,487,796 A | 12/1984 | Lloyd et al. | |
| 4,502,912 A | 3/1985 | Steiner et al. | |
| 4,671,983 A | 6/1987 | Burt | |
| 4,803,032 A | 2/1989 | Schulz | |
| 5,143,776 A | 9/1992 | Givens | |
| 5,173,351 A | 12/1992 | Ruppel et al. | |
| 5,269,983 A | 12/1993 | Schulz | |
| 5,332,472 A | 7/1994 | Cutright et al. | |
| 5,356,364 A | 10/1994 | Veith et al. | |
| 5,431,786 A | 7/1995 | Rasch et al. | |
| 5,503,896 A | 4/1996 | Veith et al. | |
| 5,686,168 A | 11/1997 | Laurent et al. | |
| 5,693,403 A | 12/1997 | Brown et al. | |
| 5,702,571 A | 12/1997 | Kamps et al. | |
| 5,743,999 A | 4/1998 | Kamps et al. | |
| 5,773,081 A | 6/1998 | Williamitis et al. | |
| 5,874,156 A | 2/1999 | Schulz | |
| 6,086,715 A | 7/2000 | McNeil | |
| 6,106,928 A | 8/2000 | Laurent et al. | |
| 6,235,373 B1 | 5/2001 | Graff | |
| 6,348,131 B1 | 2/2002 | Kershaw et al. | |
| 6,589,634 B2 | 7/2003 | Schultz et al. | |
| 6,602,577 B1 | 8/2003 | Ostendorf et al. | |
| 6,647,883 B1 | 11/2003 | McNeil | |
| 6,715,411 B1 | 4/2004 | Boegli | |
| 6,739,024 B1 | 5/2004 | Wagner | |
| 6,746,570 B2 | 6/2004 | Burazin et al. | |
| 6,802,937 B2 | 10/2004 | Johnston et al. | |
| 6,821,385 B2 | 11/2004 | Burazin et al. | |
| 6,846,172 B2 | 1/2005 | Vaughn et al. | |
| 7,235,156 B2 | 6/2007 | Baggot | |
| 7,285,317 B2 | 10/2007 | Biagiotti et al. | |
| D554,867 S | 11/2007 | Bianchi | |
| 7,314,663 B2 | 1/2008 | Stelljes, Jr. et al. | |
| 7,314,664 B2 | 1/2008 | Stelljes, Jr. et al. | |
| 7,314,665 B2 | 1/2008 | Stelljes, Jr. et al. | |
| 7,494,564 B2 | 2/2009 | Basler et al. | |
| D612,616 S | 3/2010 | Sanders et al. | |
| D618,462 S | 6/2010 | Fung et al. | |
| D618,918 S | 7/2010 | Hutchison et al. | |
| D624,756 S | 10/2010 | Walther et al. | |
| D634,551 S | 3/2011 | Colella et al. | |
| 2003/0031919 A1 | 2/2003 | Isozaki et al. | |
| 2003/0116291 A1 | 6/2003 | Zoeller et al. | |
| 2003/0175441 A1 | 9/2003 | Bernards et al. | |
| 2004/0062916 A1* | 4/2004 | Mansson | B31F 1/07 428/198 |
| 2004/0084167 A1 | 5/2004 | Vinson et al. | |
| 2004/0121133 A1* | 6/2004 | Andersson | B32B 7/14 428/196 |
| 2004/0231813 A1 | 11/2004 | Basler et al. | |
| 2005/0006816 A1 | 1/2005 | Drut et al. | |
| 2005/0069679 A1 | 3/2005 | Steljes et al. | |
| 2005/0138981 A1 | 6/2005 | Wilhelm | |
| 2005/0153100 A1* | 7/2005 | Zoller | B31F 1/07 428/131 |
| 2006/0088697 A1* | 4/2006 | Manifold | D21H 27/02 428/174 |
| 2006/0193985 A1 | 8/2006 | McNeil et al. | |
| 2006/0278355 A1* | 12/2006 | Boatman | B31F 1/07 162/117 |
| 2007/0056704 A1 | 3/2007 | Wilke | |
| 2007/0272381 A1 | 11/2007 | Elony et al. | |
| 2010/0028621 A1* | 2/2010 | Byrne | B31F 1/07 428/195.1 |
| 2010/0030174 A1 | 2/2010 | Buschur et al. | |
| 2010/0297377 A1 | 11/2010 | Mellin et al. | |
| 2010/0297378 A1 | 11/2010 | Mellin et al. | |
| 2010/0297395 A1 | 11/2010 | Mellin et al. | |
| 2010/0297400 A1 | 11/2010 | Mellin et al. | |
| 2012/0244241 A1 | 9/2012 | McNeil | |

FOREIGN PATENT DOCUMENTS

| | | |
|---|---|---|
| EP | 1 099 539 A1 | 5/2001 |
| EP | 1 203 619 A2 | 5/2002 |
| EP | 796727 B1 | 9/2002 |
| EP | 1 876 291 A2 | 1/2008 |
| WO | WO 1994/003677 A1 | 2/1994 |
| WO | WO 96/00814 A1 | 1/1996 |
| WO | WO 96/18771 A1 | 6/1996 |
| WO | WO 97/20107 A1 | 6/1997 |
| WO | WO 98/47706 A1 | 10/1998 |
| WO | WO 1998/047697 A1 | 10/1998 |
| WO | WO 00/31341 A1 | 6/2000 |
| WO | WO 00/38565 A1 | 7/2000 |
| WO | WO 00/73053 A1 | 12/2000 |
| WO | WO 02/40769 A2 | 5/2002 |
| WO | WO 03/072344 A1 | 9/2003 |
| WO | WO 2005/042273 A2 | 5/2005 |
| WO | WO 2006/092818 A1 | 9/2006 |
| WO | WO 2009/107021 A1 | 9/2009 |
| WO | WO 2010/017189 A1 | 2/2010 |

OTHER PUBLICATIONS

All Office Actions in U.S. Appl. No. 12/468,523 (P&G Case 11328), U.S. Appl. No. 12/468,574 (P&G Case 11329), U.S. Appl. No. 12/468,557 (P&G Case 11330), and U.S. Appl. No. 12/468,394 (P&G Case 11339), U.S. Appl. No. 14/268,182 (P&G Case 11339D), U.S. Appl. No. 14/268,211 (P&G Case 11339D2).

* cited by examiner

METHOD FOR MAKING MULTI-PLY FIBROUS STRUCTURES

FIELD OF THE INVENTION

The present invention relates to multi-ply fibrous structures and more particularly, to embossed multi-ply fibrous structures and methods for making such embossed multi-ply fibrous structures.

BACKGROUND OF THE INVENTION

Embossed multi-ply fibrous structures wherein two or more fibrous structure plies are adhesively bonded together ("plybonded") are known in the art. However, known plybonding techniques have negatives that consumers of the embossed multi-ply fibrous structures do not like.

Accordingly, there is a need for a new and/or improved adhesively plybonded embossed multi-ply fibrous structure that overcomes the negatives of the known adhesively plybonded embossed multi-ply fibrous structures.

SUMMARY OF THE INVENTION

The present invention fulfills the need described above by providing an embossed multi-ply fibrous structure that overcomes the negatives associated with known embossed multi-ply fibrous structures.

In one example of the present invention, an embossed multi-ply fibrous structure comprising 10% or less total embossed area, wherein two or more plies of the embossed multi-ply fibrous structure are bonded together in a face-to-face relationship such that the embossed multi-ply fibrous structure comprises a maximum unbonded area of less than 51 mm×22 mm as determined by the Maximum Unbonded Area Test Method, is provided.

In another example of the present invention, an embossed multi-ply fibrous structure comprising 10% or less total embossed area, wherein two or more plies of the embossed multi-ply fibrous structure are bonded together in a face-to-face relationship such that the embossed multi-ply fibrous structure comprises a maximum unbonded area of less than 34 mm×34 mm as determined by the Maximum Unbonded Area Test Method, is provided.

In yet another example of the present invention, an embossed multi-ply fibrous structure comprising a plurality of discrete regions of adhesive, wherein at least one discrete region of adhesive is spaced apart from adjacent regions of adhesive by a radius of at least 3 mm and/or at least 5 mm and/or at least 7 mm and/or at least 10 mm as measured by the Maximum Span Test Method, is provided. One or more of the discrete regions of adhesive may be present in an unembossed region and/or in an embossment.

In still another example of the present invention, a multi-ply sanitary tissue product comprising an embossed multi-ply fibrous structure according to the present invention, is provided.

In yet another example of the present invention, a method for making an embossed multi-ply fibrous structure, the method comprises the steps of:
  a. providing a first ply of an embossed fibrous structure comprising at least one embossment;
  b. providing a second ply of a fibrous structure;
  c. applying an adhesive to at least one of the plies;
  d. bonding the two plies together in a face-to-face relationship such that an embossed multi-ply fibrous structure comprising 8.4% or less total embossed area, wherein two or more plies of the embossed multi-ply fibrous structure are bonded together in a face-to-face relationship such that embossed multi-ply fibrous structure comprises a maximum unbonded area of less than 51 mm×22 mm as determined by the Maximum Unbonded Area Test Method is produced, is provided.

In still yet another example of the present invention, a method for making an embossed multi-ply fibrous structure, the method comprises the steps of:
  a. providing a first ply of an embossed fibrous structure comprising at least one embossment;
  b. providing a second ply of a fibrous structure;
  c. applying an adhesive to at least one of the plies;
  d. bonding the two plies together in a face-to-face relationship such that an embossed multi-ply fibrous structure comprising 10% or less total embossed area, wherein two or more plies of the embossed multi-ply fibrous structure are bonded together in a face-to-face relationship such that embossed multi-ply fibrous structure comprises a maximum unbonded area of less than 34 mm×34 mm as determined by the Maximum Unbonded Area Test Method is produced, is provided.

Accordingly, the present invention provides embossed multi-ply fibrous structures that overcome consumer negatives associated with known embossed multi-ply fibrous structures and methods for making such embossed multi-ply fibrous structures.

DETAILED DESCRIPTION OF THE INVENTION

Definitions

Figure 1:
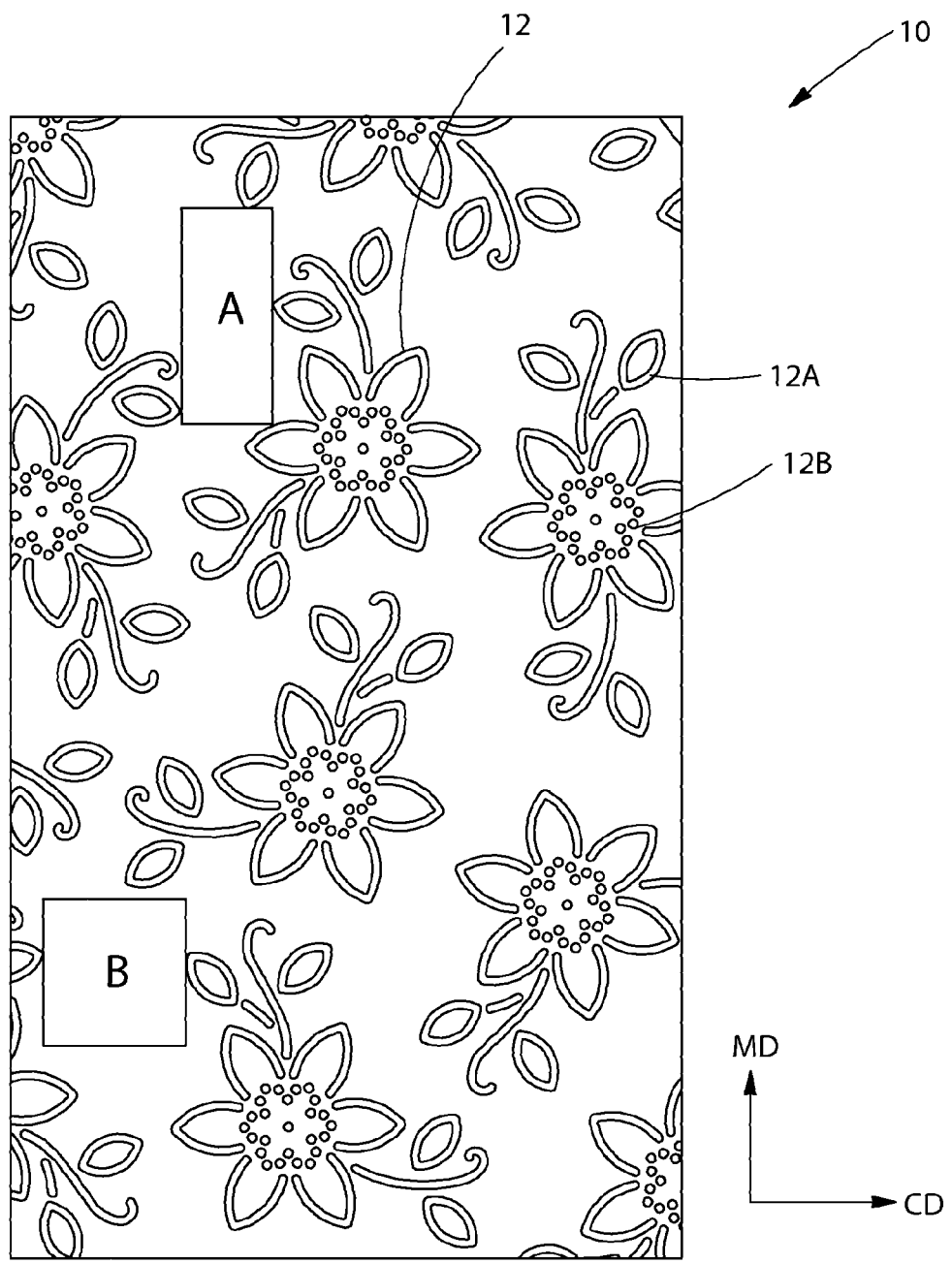
FIG. 1 is a top plan view of an example of an embossed multi-ply fibrous structure according to the present invention.

"Fibrous structure" as used herein means a structure that comprises one or more filaments and/or fibers. In one example, a fibrous structure according to the present invention means an orderly arrangement of filaments and/or fibers within a structure in order to perform a function. Nonlimiting examples of fibrous structures of the present invention include paper, fabrics (including woven, knitted, and nonwoven), and absorbent pads (for example for diapers or feminine hygiene products).

Nonlimiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry.

The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structure of the present invention may exhibit a basis weight between about 10 g/m² to about 120 g/m² and/or from about 15 g/m² to about 110 g/m² and/or from about 20 g/m² to about 100 g/m² and/or from about 30 to 90 g/m². In addition, the fibrous structure of the present invention may exhibit a basis weight between about 40 g/m² to about 120 g/m² and/or from about 50 g/m² to about 110 g/m² and/or from about 55 g/m² to about 105 g/m² and/or from about 60 to 100 g/m².

The fibrous structure of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the fibrous structure of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the fibrous structure exhibits a total dry tensile strength of less than about 394 g/cm (1000 g/in) and/or less than about 335 g/cm (850 g/in).

In another example, the fibrous structure of the present invention may exhibit a total dry tensile strength of greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The fibrous structure of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in).

The fibrous structure of the present invention may exhibit an initial total wet tensile strength of greater than about 118 g/cm (300 g/in) and/or greater than about 157 g/cm (400 g/in) and/or greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in).

The fibrous structure of the present invention may exhibit a density (measured at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The fibrous structure of the present invention may be in the form of fibrous structure rolls. Such fibrous structure rolls may comprise a plurality of connected, but perforated sheets of fibrous structure, that are separably dispensable from adjacent sheets. In one example, one or more ends of the roll of fibrous structure may comprise an adhesive and/or dry strength agent to mitigate the loss of fibers, especially wood pulp fibers from the ends of the roll of fibrous structure.

The fibrous structure of the present invention may comprise one or more additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on fibrous structure.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Nonlimiting examples of fibers include wood pulp fibers and synthetic staple fibers such as polyester fibers.

Filaments are typically considered continuous or substantially continuous in nature. Filaments are relatively longer than fibers. Nonlimiting examples of filaments include meltblown and/or spunbond filaments. Nonlimiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft$^2$ or g/m$^2$.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Plybond Strength" as used herein means tensile strength of the multi-ply fibrous structure as measured by the Plybond Strength Test Method described herein.

"Plybond Area" as used herein means the total area of the multi-ply fibrous structure that is bonded together as measured by the Plybond Area Test Method described herein.

"Line element embossment" as used herein means an embossment that comprises a continuous line that has an aspect ratio of greater than 1.5:1 and/or greater than 1.75:1 and/or greater than 2:1 and/or greater than 5:1. In one example, the line element embossment exhibits a length of at least 2 mm and/or at least 4 mm and/or at least 6 mm and/or at least 1 cm to about 10.16 cm and/or to about 8 cm and/or to about 6 cm and/or to about 4 cm.

"Dot embossment" as used herein means an embossment that exhibits an aspect ratio of about 1:1. Non-limiting examples of dot embossments are embossments that are shaped like circles, squares and triangles.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Multi-Ply Fibrous Structure

The multi-ply fibrous structure of the present invention comprises two or more fibrous structure plies bonded to one another, for example in a face-to-face relationship.

FIG. 1 shows an embossed multi-ply fibrous structure 10 comprising a plurality of embossments 12, both line element embossments 12A and dot embossments 12B. Even though FIG. 1 shows both line element embossments 12A and dot embossments 12B, the fibrous structure 10 may comprise all line element embossments 12A or all dot embossments 12B. The embossed multi-ply fibrous structure 10 comprises 10% and/or 9% and/or 8.5% and/or 8% and/or 7% and/or 6% or less total embossed area. The embossed multi-ply fibrous structure 10 comprises two or more fibrous structure plies that are bonded together in a face-to-face relationship such that the embossed multi-ply fibrous structure comprises a maximum unbonded area of less than 51 mm×22 mm (as shown by rectangle A in FIG. 1) and/or less than 34 mm×34 mm (as shown by square B in FIG. 1) as determined by the Maximum Unbonded Area Test Method described herein.

In one example, the maximum unbonded area is oriented in the machine direction. In another example, the maximum unbonded area is oriented in the cross machine direction. In still another example, the maximum unbonded area is located immediately adjacent to an edge of the embossed multi-ply fibrous structure. In yet another example, the maximum unbonded area is located immediately adjacent to at least one transverse line of weakness, such as a perforation, which the embossed multi-ply fibrous structure may comprise.

Figure 2:
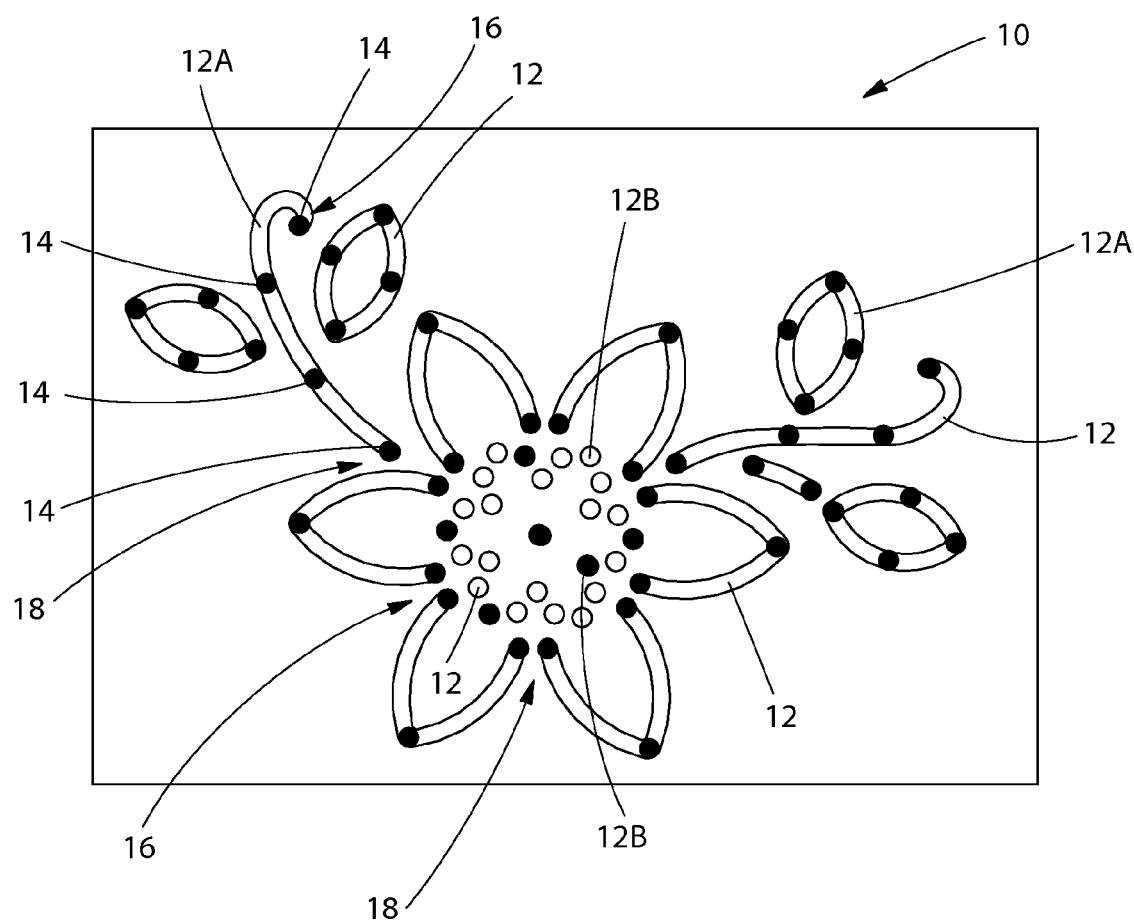
FIG. 2 is a top plan view of another example of an embossed multi-ply fibrous structure according to the present invention.
Figure 3:
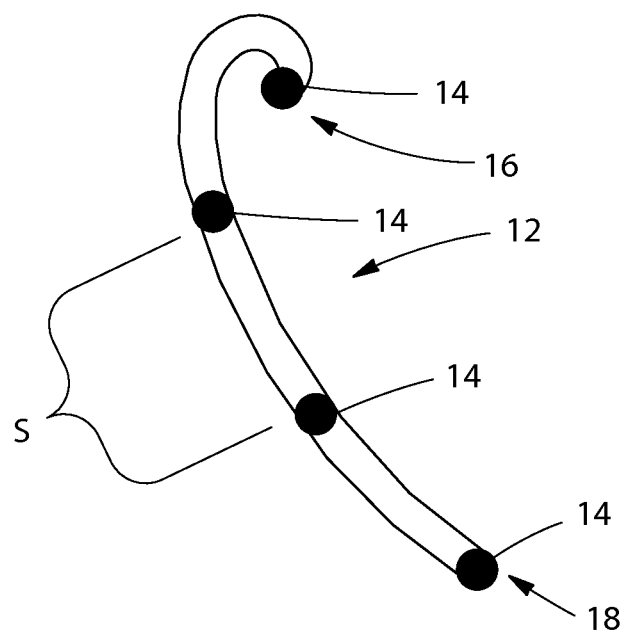
FIG. 3 is an exploded top plan view of a line element embossment from the embossed fibrous structure of FIG. 1.

As shown in FIG. 2, the embossed multi-ply fibrous structure 10 comprises at least one embossment 12. The embossment 12 may comprise a line element embossment 12A. As shown in FIGS. 2 and 3, the line element embossment 12A may comprise at least one and/or at least two discrete regions of adhesive 14 that cover less than the entire surface area of the line element embossment 12A. The discrete region of adhesive 14 may be positioned between the line element embossment's termini 16 and 18. The line element embossment 12A may comprises two discrete regions of adhesive 14 that are positioned at the line element embossment's termini 16 and 18. The line element embossment 12A may comprise at least one discrete region of adhesive 14 positioned between two discrete regions of adhesive 14 within the line element embossment 12A. When the line element embossment 12A comprises two or more discrete regions of adhesive 14, they are spaced apart 15 mm and/or 10 mm and/or 8 mm or less from each other.

At least one line element embossment exhibits a length of greater than 5 mm and/or greater than 10 mm and/or greater than 15 mm.

The embossed multi-ply fibrous structure of the present invention may comprise a plurality of line element embossments wherein at least 50% of the line element embossments exhibit a length of greater than 5 mm and/or greater than 10 mm and/or greater than 15 mm.

In addition to the line element embossments, as shown in FIG. 2, the embossed multi-ply fibrous structure may comprise at least one dot embossment. The dot embossment may comprise at least one discrete region of adhesive that covers less that the entire surface area of the dot embossment.

In one example of the present invention, the embossed multi-ply fibrous structure may comprise at least 0.2% of the total embossed area comprises line element embossments and at least 0.2% of the total embossed area comprises dot embossments. The ratio of line element embossment area to dot embossment area is greater than 1.

The embossed multi-ply fibrous structure may be in the form of a convolutely wound roll comprising transverse lines of weakness that segment the embossed multi-ply fibrous structure into separable units.

The embossed multi-ply fibrous structure may exhibit a ratio of plybond strength to plybond area of the embossed multi-ply fibrous structure of greater than 100 g/in/% plybond area.

FIG. 2 shows an embossed multi-ply fibrous structure 10 comprising a plurality of embossments 12, both line element embossments 12A and dot embossments 12B. Even though FIG. 2 shows both line element embossments 12A and dot embossments 12B, the fibrous structure 10 may comprise all line element embossments 12A or all dot embossments 12B. As shown in FIGS. 2 and 3, at least one embossment 12 comprises two or more discrete regions of adhesive 14 that cover less than the entire surface area of the embossment 12. The two or more discrete regions of adhesive 14 are arranged on the embossment 12 such that the maximum span S between any two adjacent regions of adhesive 14 is less than 50 mm and/or less than 25 mm and/or less than 10 mm as measured according to the Maximum Span Test Method described herein. It has been unexpectedly found that multi-ply fibrous structures that comprise embossments wherein only a portion of the embossments are bonded exhibit improved softness and flexibility compared to multi-ply fibrous structures that contain adhesive that cover substantially all of the embossments. It has also been unexpectedly found that multi-ply fibrous structures that comprise embossments that contain regions of adhesive 14 that are spaced apart from one another within the embossment by 15 mm or less exhibit improved softness and/or flexibility compared to multi-ply fibrous structures that contain adhesive that covers substantially the entire surface area of the embossment. It has also been unexpectedly found that multi-ply fibrous structures that comprise embossments wherein only a portion of the embossments are bonded and/or wherein only a portion of individual embossment areas are bonded provides improved softness and/or flexibility while maintaining sufficient bond strength uniformity to meet consumer needs for strength and durability compared to multi-ply fibrous structures that contain adhesive that covers substantially the entire surface area of the embossments and individual embossment areas.

As shown in FIG. 2, the embossed multi-ply fibrous structure 10 may comprise a plurality of embossments 12 wherein a portion of the embossments 12 comprises at least two regions of adhesive 14, for example the line element embossments 12A. As seen in FIG. 2, the dot embossments 12B of the fibrous structure 10 only contains a single region of adhesive if any at all.

As shown in FIGS. 2 and 3, one or more discrete regions of adhesive 14 may be positioned at the ends of one or more line element embossments 12A. It has been unexpectedly found that by doing so the clarity of the embossment 12A is improved compared to not placing one or more discrete regions of adhesive 14 at the ends (termini) of the line element embossments 12A. Further, it has been found that by providing one or more discrete regions of adhesive 14 near the center of the line element embossment 12A helps to improve the clarity of the embossment 12A as compared to not placing one or more discrete regions of adhesive 14 near the center of the line element embossment 12A.

By distributing discrete regions of adhesive throughout the embossments and the entire embossment pattern, the embossed multi-ply fibrous structure of the present invention exhibits minimized open areas (areas that are void of adhesive and thus have a tendency to separate from the other ply during handling by a consumer). This principle of minimization of open areas also aids in keeping the sheet edges and any perforation lines (transverse lines of weakness) of the embossed multi-ply fibrous structure bonded by having adhesive present on a portion of the embossments near the edges and/or near the perforation lines.

In one example, the embossed fibrous structure 10 comprises a plurality of embossments wherein at least 25% and/or at least 35% and/or at least 50% of the embossments comprise two or more discrete regions of adhesive that cover less than the entire surface area of the embossments. The embossments may comprise line element embossments. Further, at least 25% and/or at least 35% and/or at least 50% of the line element embossments comprises two or more discrete regions of adhesive that cover less than the entire surface area of the embossments.

One or more of the line element embossments of the present invention may exhibit a length of greater than 5 mm and/or greater than 10 mm and/or greater than 15 mm. In one example, at least 50% and/or at least 65% and/or at least 75% and/or less than about 100% and/or less than about 90% of the line element embossments present on the fibrous structure and/or containing two or more discrete regions of adhesive exhibit a length of greater than 5 mm and/or greater than 10 mm and/or greater than 15 mm.

The embossed multi-ply fibrous structure may comprise one or more embossed single-ply fibrous structures which can be combined with a another ply, such as another fibrous structure, the same or different from the embossed single-ply fibrous structure, to form an embossed multi-ply fibrous structure according to the present invention. The second ply may be void of adhesive, it may be void of embossments, it may comprise adhesive, it may comprise embossments that are the same as those in the embossed fibrous structure, which align with the embossments in the embossed fibrous structure resulting in plybonding of the plies via the adhesive on the embossments to produce an embossed multi-ply fibrous structure according to the present invention.

Figure 4:
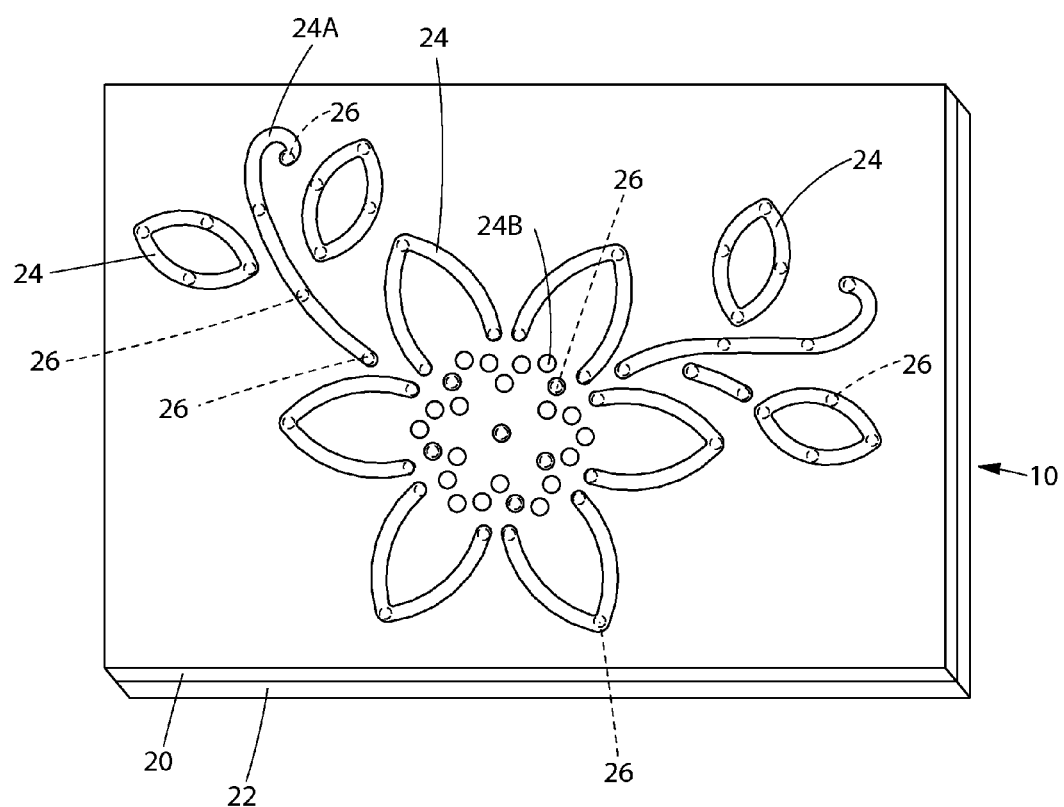
FIG. 4 is a perspective view of an example of an embossed multi-ply fibrous structure according to the present invention.

As shown in FIG. 4, an embossed multi-ply fibrous structure 10 comprises a first ply of fibrous structure 20 and a second ply of fibrous structure 22. The first and second plies 20, 22 may be the same or different from one another. The embossed multi-ply fibrous structure 10 comprises a plurality of embossments 24, which may be line element embossments 24A or dot embossments 24B. At least one of the embossments 24 may comprise two or more discrete regions of adhesive 26. For example, the line element embossment 24A comprises two or more discrete regions of adhesive 26. However, some of the embossments, for example the dot embossments 24B may comprise only one region of adhesive 26. The adhesive 26 is positioned between the two plies 20, 22 and bonds their adjoining faces together.

In one example, the two or more discrete regions of adhesive 26 may be arranged on an embossment 24 such that the maximum span between any two adjacent regions of adhesive 26 is less than 50 mm and/or less than 25 mm and/or less than 10 mm when measured according to the Maximum Span Test Method described herein.

In one example, the embossed multi-ply fibrous structure of the present invention is in the form of a convolutely wound roll. The embossed multi-ply fibrous structure may comprise transverse lines of weakness, for example lines of weakness that run in the cross machine direction across the embossed multi-ply fibrous structure. The lines of weakness facilitate dispensing of individual or groups of sheets from the remainder of the embossed multi-ply fibrous structure. The lines of weakness segment the embossed multi-ply fibrous structure into separable units.

In one example, the transverse lines of weakness comprise perforations.

The embossed multi-ply fibrous structure may exhibit a ratio of plybond strength, as measured according to the Plybond Strength Test Method described herein, to plybond area, as measured according to the Plybond Area Test Method described herein, of greater than 100 g/in/% plybond area and/or greater than about 150 g/in/% plybond area and/or greater than about 175 g/in/% plybond area and/or greater than about 200 g/in/% plybond area and/or greater than about 225 g/in/% plybond area. In one example, the multi-ply fibrous structure of the present invention exhibits a ratio of plybond strength to plybond area of greater than 100 g/in/% plybond area to about 1000 g/in/% plybond area and/or from about 150 g/in/% plybond area to about 750 g/in/% plybond area and/or from about 175 g/in/% plybond area to about 500 g/in/plybond area and/or from about 175 g/in/% plybond area to about 400 g/in/% plybond area.

The embossed multi-ply fibrous structure of the present invention may exhibit any suitable plybond strength and plybond area so long as the ratio of plybond strength to plybond area is greater than 100 g/in/% plybond area and/or greater than about 150 g/in/% plybond area and/or greater than about 175 g/in/% plybond area and/or greater than about 200 g/in/% plybond area and/or greater than about 225 g/in/% plybond area.

In one example, the embossed multi-ply fibrous structure exhibits a plybond strength of greater than about 0.5 g/in and/or greater than about 0.75 g/in and/or greater than about 1.0 g/in and/or greater than about 1.5 g/in and/or greater than about 2.0 g/in. In another example, the multi-ply fibrous structure of the present invention exhibits a plybond area of less than about 10% and/or less than about 7% and/or less than about 5% and/or less than about 3% and/or less than about 1% and/or less than about 0.75% and/or greater than about 0.05% and/or greater than about 0.1% and/or greater than about 0.3% and/or greater than about 0.5%. In one example, the multi-ply fibrous structure comprises embossments, wherein all or substantially all of the embossments are plybonded with an adhesive. In another example, less than 60% of the total embossments are plybonded with an adhesive. In another example, the multi-ply fibrous structure comprises linear embossments, wherein less than 50% of the area of each linear embossment is plybonded with an adhesive. In another example, the multi-ply fibrous structure comprises linear embossments, wherein less than 20% of the area of each linear embossment is plybonded with an adhesive.

The embossed multi-ply fibrous structure of the present invention may comprise one or more embossments having an embossment height of greater than 200 μm and/or greater than about 300 μm and/or greater than about 400 μm as measured by the Embossment Height Test Method described herein.

In one example, an embossed multi-ply fibrous structure wherein less than about 60% and/or less than 50% and/or less than 40% and/or greater than 5% and/or greater than 10% of the total embossment area in the embossed fibrous structure is plybonded.

In another example, an embossed multi-ply fibrous structure of the present invention comprises embossments wherein all of the embossments are plybonded by an adhesive. In yet another example, an embossed multi-ply fibrous structure of the present invention comprises embossments wherein only a portion of the total embossments are plybonded by an adhesive. In even another example, an embossed multi-ply fibrous structure of the present invention comprises embossments wherein only portions (not in entirety) of each embossment are plybonded by an adhesive. In still another example, an embossed multi-ply fibrous structure of the present invention comprises embossments wherein only portions (not in entirety) of a portion of the total embossments are plybonded by an adhesive. In one example, an embossed multi-ply fibrous structure comprises line element embossments wherein only portions of each line element embossment are plybonded by an adhesive. In yet another example, an embossed multi-ply fibrous structure comprises line element embossments wherein only portions of a portion of the total line element embossments are plybonded by an adhesive. In another example, an embossed multi-ply fibrous structure comprises line element embossments greater than 5 mm in length wherein only a portion of the line elements embossments are bonded and wherein the bonded portion of the embossments comprises one or more discrete regions within the embossment. In another example, an embossed multi-ply fibrous structure comprises line element embossments greater than 10 mm in length wherein only a portion of the line element embossments are bonded and wherein the bonded portion of the embossments comprises two or more separate and discrete regions within the embossment. In another example, an embossed multi-ply fibrous structure comprises line element embossments greater than 15 mm in length wherein only a portion of the line elements embossments are bonded and wherein the bonded portions of the embossments comprise three or more separate and discrete regions of the embossment. In still yet another example, an embossed multi-ply fibrous structure comprises dot embossments wherein only portions of each dot embossment are plybonded by an adhesive. In even yet another example, an embossed multi-ply fibrous structure comprises dot embossments wherein only portions of a portion of the total dot embossments are plybonded by an adhesive.

In another example of the embossed multi-ply fibrous structure of the present invention, the discrete regions of adhesive are present in the embossed multi-ply fibrous structure at a level of less than 1.5 discrete regions of adhesive/cm$^2$ and/or less than 1.4 discrete regions of adhesive/cm$^2$ and/or less than 1.35 discrete regions of adhesive/cm$^2$ and/or less than 1.3 discrete regions of adhesive/cm$^2$.

Process for Making an Embossed Multi-Ply Fibrous Structure

The embossed multi-ply fibrous structure of the present invention may be made by any suitable process known in the art so long as the embossed multi-ply fibrous structure comprises at least one embossment comprising at least two regions of adhesive that cover less than the entire surface area of the embossment wherein the maximum span between any two adjacent regions of adhesive in the embossment is less than 50 mm.

In one example, the embossed multi-ply fibrous structure is made such that it exhibits a ratio of plybond strength to plybond area of greater than 100 g/in/% plybond area.

Figure 5:
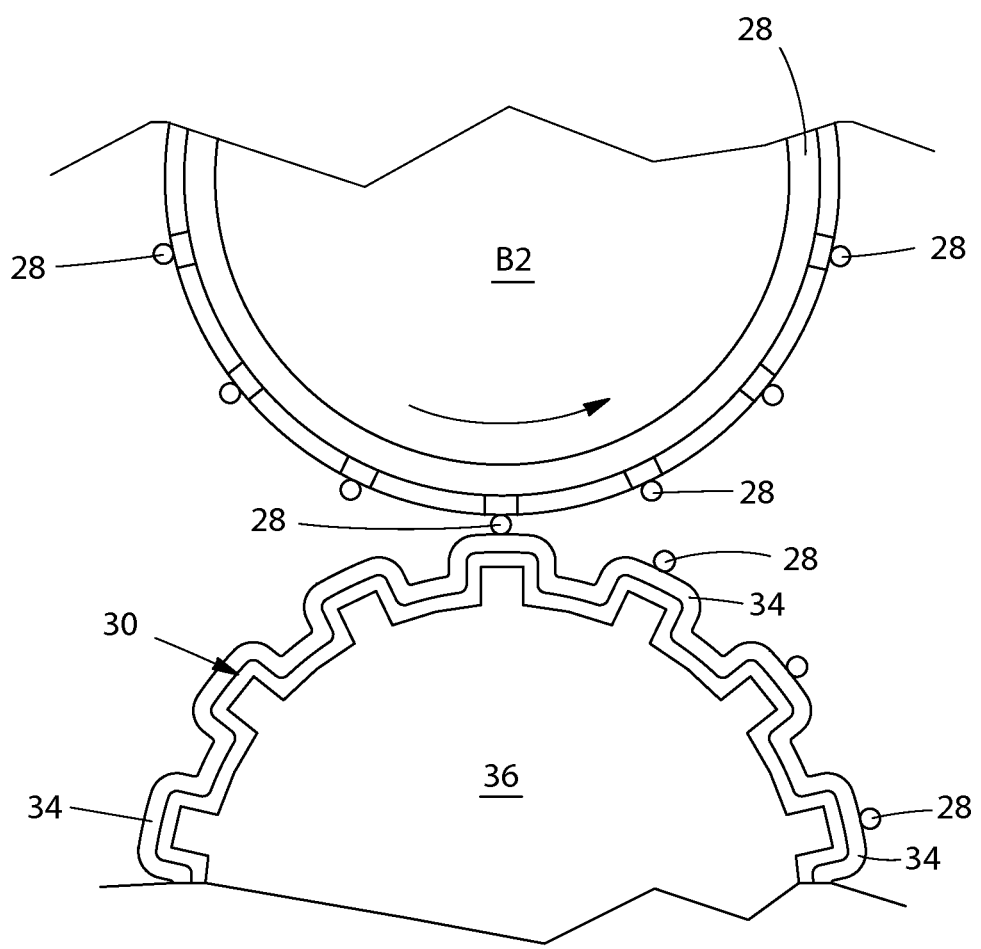
FIG. 5 is a partial, cross-sectional view of a process for making a multi-ply fibrous structure.

In one example, as shown in FIG. 5, an embossed multi-ply fibrous structure according to the present invention may be made by a process comprising the step of delivering an adhesive 28 to a surface of a fibrous structure, for example an embossed fibrous structure 30, using a permeable roll applicator 32 that contains adhesive 28. The permeable roll applicator 32 may be designed to deposit two or more discrete regions of adhesive 28 on embossments 34 such that the adhesive covers less than the entire surface area of one or more embossments 34 and that the maximum span S between any two adjacent regions of adhesive in an embossment is less than 50 mm when measured according to the Maximum Span Test Method described herein. The permeable applicator 32 may be designed to deliver adhesive 28 to a portion of the embossments 34 or portions of a portion of the embossments 34 of the embossed fibrous structure 30, for example as the embossed fibrous structure 30 is in contact with a patterned embossing roll 36. Once the fibrous structure, for example the embossed fibrous structure 30, contains the adhesive 28, the fibrous structure is bonded via the adhesive 28 to another fibrous structure (not shown) and passes through a marrying roll nip (not shown) which applies a compressive force to the bonded fibrous structure (not shown).

Figure 6:
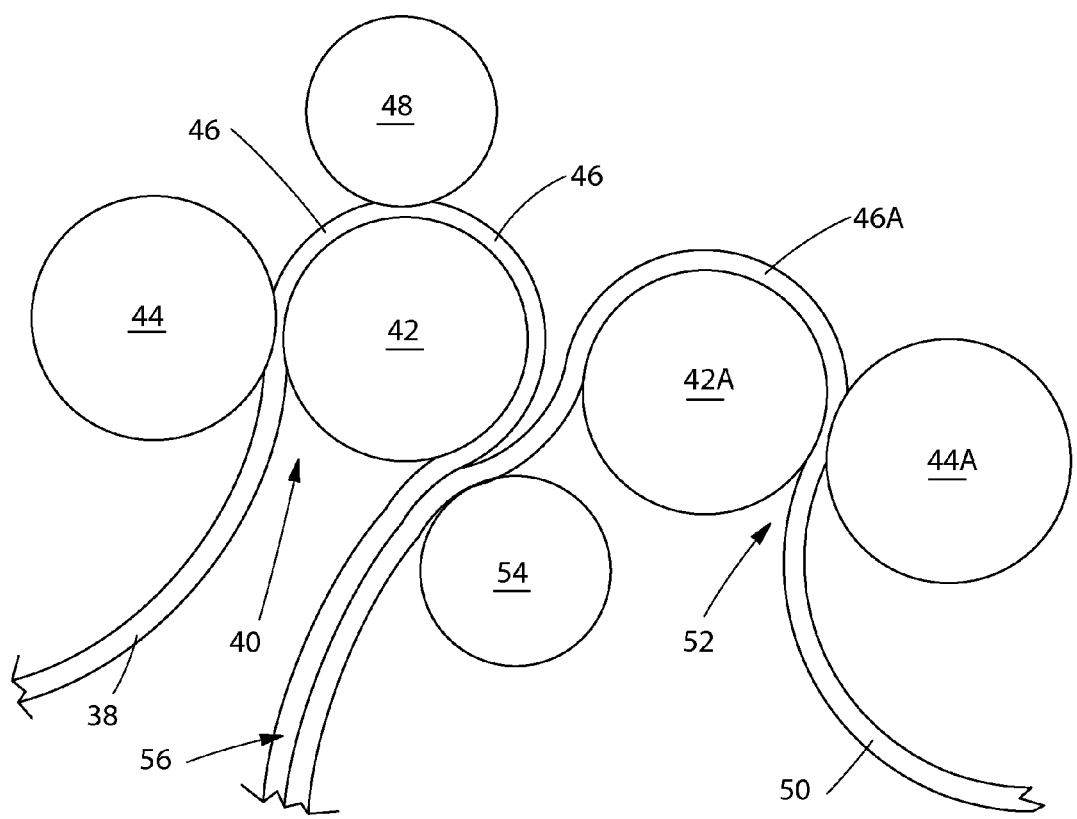
FIG. 6 is a schematic representation of a process for making multi-ply fibrous structure.

In one example of a process for making a multi-ply fibrous structure, as represented in FIG. 6, a first fibrous structure 38 is embossed by embossing nip 40 formed by a first patterned embossing roll 42 and a second patterned embossing roll 44 to produce an embossed fibrous structure 46. An adhesive (not shown) is then applied to portions of a portion of the individual embossments such that the adhesive is applied in two or more discrete regions on one or more of the embossments and covers less than the entire surface area of the one or more embossments present in the embossed fibrous structure 46 by an applicator roll 48, which may be a permeable fluid applicator roll. A second fibrous structure 50 is embossed by embossing nip 52 formed by a first patterned embossing roll 42A and a second patterned embossing roll 94A to produce an embossed fibrous structure 46A. The embossed fibrous structure 46 and embossed fibrous structure 46A are brought into proximity of one another and are compressed together upon loading of a marrying roll 54 against the first patterned embossing roll 42 via pneumatic or hydraulic or other suitable means to achieve the desired compressive force. This compressive force bonds the two embossed fibrous structures 46, 46A (plies) together while the embossed fibrous structure 46 is still positioned in its embossing location—that is, the embossments of the embossed fibrous structure 46 are still located on the corresponding emboss pattern elements (for example, protrusions) on the first patterned embossing roll 42 and the adhesive that has been applied to the embossed fibrous structure 46 is also still aligned with the emboss pattern elements (for example, protrusions). The compressive force thus bonds the two embossed fibrous structures 46, 46A together to form an embossed multi-ply fibrous structure 56.

In one example, the holes of the permeable roll may be registered with other features in a fibrous structure ply making up the multi-ply fibrous structure of the present invention prior to the plybonding process. In another example, other features in a fibrous structure ply making up the multi-ply fibrous structure of the present invention may be registered to the embossments and/or the bonded regions of the embossments. The holes in the permeable roll may all be the same shape and/or diameter or two or more of the holes may be different shapes and/or different diameters. Further, the length and diameter ratio for a particular hole in the permeable roll may be selected to provide desired adhesive flow characteristics.

Adhesive may be applied as discrete drops, as an essentially continuous pattern of adhesive or any combination thereof onto a fibrous structure, such as an embossed fibrous structure. Typically, at least one fibrous structure is embossed and then at least one fibrous structure is passed by an adhesive application zone where adhesive is applied to a portion of the fibrous structure. Typically, the embossed fibrous structure remains on the embossing pattern roll as the roll rotates past the embossing nip. The fibrous structure is typically deformed in the z-direction such that after the embossing nip, portions of the fibrous structure between embossing elements are deformed down into the relieved portion of the embossing pattern roll, leaving the embossments on the fibrous structure as the most outward oriented portion of the fibrous structure on the periphery of the embossing pattern roll.

In one example, adhesive is applied to a fibrous structure, such as an embossed fibrous structure, using a permeable roll. Adhesive is delivered from the interior of the permeable roll as it rotates and as the fibrous structure comes into contact with the adhesive from the permeable roll.

By utilizing the permeable roll to apply adhesive to a fibrous structure, a wider range of adhesive viscosities can be used compared to known adhesive application systems. Adhesives that exhibit higher viscosities and/or higher solids content provide high adhesion and can thus enable achieving adequate plybond with very low adhesive add-on rates and relatively low lamination pressures. In addition to the adhesion properties, the permeable roll system also provides better hygiene conditions since it minimizes dust transfer to any interfacing rolls, for example a patterned roll, and/or adhesive applicator system during operation.

The adhesive may be applied intermittently to the fibrous structure. Further, the rate of application of the adhesive may be controlled by fibrous structure speed, fibrous structure material characteristics and/or properties, fibrous structure tension, and combinations thereof.

In one example of the present invention, a low pressure marrying roll nip (for example, less than about 40 pli (pounds force per linear inch in the nip) and/or less than about 20 pli and/or less than about 10 pli to about 1 pli and/or to about 2 pli and/or to about 5 pli) for laminating the fibrous structures together is achievable due to the fact that a higher tack, high viscosity adhesive, such as polyvinyl alcohol (14% solids, 10,000 centipoise) can be used. A non-limiting example of a suitable adhesive is commercially available from Henkel as Henkel 52-6014. Such an adhesive is more effective at creating bond strength than lower tack, low viscosity adhesives, which are typically required to be used in adhesive application processes other than the permeable fluid applicator process. As a result, the amount of compressive force required in the marrying roll nip is significantly less than is required for existing marrying roll nip processes. The use of lower compressive force is a significant advantage as it allows the use of smaller diameter embossing rolls, smaller diameter marrying rolls, and smaller diameter permeable fluid applicator roll, as well as allowing smaller machine frames, lower power drive systems, and other machine improvements that provide a smaller, lower cost manufacturing system.

In one example, all embossing, adhesive applying and marrying roll nips according to the present invention exhibit a pressure of less than about 80 pli (pounds per lineal inch) and/or less than about 60 pli and/or less than about 40 pli and/or less than about 25 pli and/or less than about 15 pli and/or less than about 10 pli and/or greater than 1 pli and/or greater than 5 pli.

After laminating (bonding two or more fibrous structure plies together), the multi-ply fibrous structure can be conveyed to other fibrous structure processing stations such as lotioning, coating, printing, slitting, folding, perforating, winding, tuft-generating, and the like. Alternatively, some of these other fibrous structure processing transformations may occur prior to the laminating (bonding) transformations.

In another process for making an embossed multi-ply fibrous structure according to the present invention, an embossed multi-ply fibrous structure comprising a plurality of discrete regions of adhesive, wherein at least one discrete region of adhesive is spaced apart from adjacent regions of adhesive by a radius of at least 3 mm may be made by employing a raised embossing element (male) mated with a corresponding recessed element (female) such that they do not permanently deform the fibrous structure. This is accomplished by making the wall gap between the mating embossing elements 0.5 mm or greater. Additionally a corresponding glue dot is placed on the fibrous structure at the raised embossing element location. A second virgin ply of fibrous structure is then mated with the fibrous structure with the glue deposited thereon and the two plies are then passed through a nip between a marrying roll and the raised embossing element roll (male). The pressure to bond these can be about 1 pli or above. Very light densification of the web will occur at this bond site. The ratio of the second virgin ply of fibrous structure to the bonded embossed fibrous structure may be about 1.5:1 or above. Further, as a non-limiting example of a variation of the technique just described, it could be desirable to create more than one raised & recessed embossing element pair intended for use to create only a bonding element site by placing them on a strain equalizing element (e.g. an "island" with multiple raised & recessed embossing elements on it) vs. having many individual raised & recessed embossing element pair sites used only for bonding element sites.

Non-Limiting Examples of a Multi-Ply Fibrous Structure

An embossed multi-ply fibrous structure according to the present invention is made by bonding two fibrous structure plies, for example two embossed through-air-dried fibrous structure plies, together such that the embossed multi-ply fibrous structure comprises at least one line element embossment greater than 15 mm in length wherein only a portion of the line elements embossment is bonded and wherein the bonded portion of the embossment comprises three or more separate and substantially continuous regions of the embossment.

An embossed multi-ply fibrous structure according to the present invention is made by bonding two fibrous structure plies, for example two embossed through-air-dried fibrous structure plies, together such that the embossed multi-ply fibrous structure comprises at least two embossments wherein at least a portion of each embossment is bonded with adhesive and wherein the maximum unbonded area between any two bonded regions is less than 51 mm×22 mm as determined by the Maximum Unbonded Area Test Method.

An embossed multi-ply fibrous structure according to the present invention is made by bonding two fibrous structure plies, for example two embossed through-air-dried fibrous structure plies, together such that the embossed multi-ply fibrous structure comprises at least two embossments wherein at least a portion of each embossment is bonded with adhesive and wherein the maximum unbonded area between any two bonded regions is less than 51 mm×22 mm as determined by the Maximum Unbonded Area Test Method.

Permeable Roll Applicator

A permeable roll of the present invention comprises an interior volume that is in fluid communication with an exterior environment. In one example, the permeable roll comprises a shell having an interior surface and an exterior surface connected to one another via one or more discrete holes which permits fluid communication from the interior volume to an external environment.

The permeable roll of the present invention may have an outer diameter that is the same as the outer diameter of any patterned embossing rolls (30.48 cm (12.00 inches) in this example) associated with the permeable roll. The permeable roll may have a stainless steel or carbon composite material shell thickness of 0.3175 cm (0.125 inch). The discrete holes in the permeable roll shell through which adhesive flows are approximately 0.2032 mm (0.008 inch) in diameter.

A typical shell fabrication process includes making a 0.3175 cm (0.125 inch) thick shell from carbon composite material and then mechanically drilling holes with the target 0.2032 mm (0.008 inch) diameter. The holes may be drilled in specific locations that may be registered to embossments or portions of embossments. Another shell fabrication process includes making a 0.3175 cm (0.125 inch) thick shell from carbon composite material and then mechanically drilling holes with at an oversized target of 0.1524 cm (0.060 inch) diameter, then spin casting epoxy or resin to fill the holes, allowing the epoxy and/or resin to cure, and then mechanically redrilling holes with the final target of 0.2032 mm (0.008 inch) diameter within the epoxy and/or resin regions within the previously drilled 0.2032 mm (0.008 inch) diameter holes.

An alternative shell fabrication process includes making a sand casting of a shell with greater thickness than required in final form, grinding the shell to a thickness of 0.6858 cm (0.27 inch), trepan drilling via laser, holes which extend from the shell inside surface to the shell outside surface in desired locations with a diameter of 0.1016 cm (0.040 inch), plasma spray coating a stainless steel based coating on the outer surface of the shell at a thickness greater than 0.1016 cm (0.040 inch), grinding the outer surface of the shell to achieve a total thickness of 0.7874 cm (0.31 inch), and then laser drilling holes with a diameter of 0.2032 mm (0.008 inch) that extend from the outer surface of the shell's plasma spray coating to the inner surface of the plasma spray coating such that the 0.2032 mm (0.008 inch) diameter hole is aligned with and completely within the 0.1016 cm (0.040 inch) diameter hole.

Other fabrication techniques as known to one of skill in the art may be used, including drilling via laser or electron beam, using concentric shells wherein the outer shell is thinner (allowing easier drilling of relatively small diameter holes) than the inner shell and is heat shrunk on the inner shell (which has been pre-drilled with larger holes which will be aligned with new holes in the thin outer shell), or other suitable techniques. Non-limiting processes for creating holes in the roll to make it a permeable roll include laser drilling, electron beam drilling, mechanical drilling, electrical discharge machining drilling, chemical engraving, metalizing processes, sintering processes, castings and combinations thereof. Another fabrication technique is the insertion of pre-perforated inserts into the shell.

Adhesive flow through the holes in the permeable roll during operation (i.e., during rotating of the permeable roll) may be directly controlled via a positive displacement pump and/or pressure regulation at the inlet to the hole within the interior surface of the permeable roll which is balanced with the pressure drop through the hole and results in a controlled flow rate. The size and pattern of the holes may be designed to provide a desired add-on rate and adhesive application pattern for a chosen adhesive and viscosity with minimum air entrainment into the adhesive application system. Adhesive flow can be adjusted on the run via adjustment of the positive displacement pump speed and/or internal pressure and may be controlled in relation to other system parameters such as line speed, operating temperature, and the like.

The holes in the permeable roll may be fabricated with any desired fluid application pattern and the fluid can be applied to a fibrous structure in contact with the permeable roll such that fluid is applied exactly where it is desired and with no fluid transfer at any other location. The permeable roll circumference and drive can be designed to match/register other process transformations, such as embossing. For example, adhesive may be applied in phased relationship to other fluids, perforations, cross machine fibrous structure edges, embossing, printing, etc. Phasing may be achieved via close coupling (direct gear drive for adjacent rolls performing different transformations), web handling/feed rate matching, closed loop control with sensing of the adhesive and other transformations in the fibrous structure, or any other suitable means. This phasing potential enables more efficient utilization of adhesives in the fibrous structure product design, thereby improving quality while minimizing adhesive cost, and enables potential synergies between transformations (e.g. highlight emboss or perforations, complement printing, etc.).

The holes in a permeable roll may be designed to match portions or all of embossments in an embossed fibrous structure. The permeable roll and the embossing roll, which imparts the embossments to the fibrous structure, may have the same diameter and circumference or a multiple of each other which may result in a mismatched speed at transfer but would still stay in phase, or it is possible to have rolls of different diameter but the emboss pattern, adhesive pattern and/or roll diameters may be such that they all stay in phase either with matched speed or mismatched speed. The permeable roll can be positioned adjacent to the embossing roll and driven in synchronization with the embossing roll via direct gear drive, timing belt, linked servo drives, and/or other suitable means to apply drops of adhesive on a desired portion of embossments in a fibrous structure after embossing and prior to the embossed fibrous structure being joined with another fibrous structure and compressed/laminated together in a marrying nip. In this manner a desired 2-ply embossed and laminated product can be produced wherein the adhesive laminating fluid is phased to embossing. This can create an embossed product having a greater softness because adhesive is only applied to the embossed fibrous structure where needed, the adhesive is also only applied to recessed embossed areas of the fibrous structure (once in sanitary tissue product form), and the adhesive zones in the fibrous structure have a relatively high volume of adhesive, thereby enabling sufficient plybond strength even with a relatively low plybonded area (less plybonded area enhances fibrous structure flexibility, a key element in consumer softness perception).

The holes in the permeable roll may be registered to an emboss pattern present on an embossed fibrous structure to provide adhesive application only on embossments or a portion of the embossments within the embossed fibrous structure. For example, adhesive may be applied to only to a portion of dot and/or line element embossments present in an embossed fibrous structure as a result of the holes of the permeable roll that applies the adhesive being registered to only a portion of the dot and/or line element embossments such that only portions of the embossments and/or portions of portions of the embossments are plybonded. For example, adhesive may be applied to a linear embossment that is 8 mm in length wherein the adhesive is only present in the middle region of the linear embossment. In another example, adhesive may be applied to only the two end regions of a linear embossment 13 mm in length. In another example, adhesive may be applied to a linear embossment that is 18 mm in length wherein the adhesive is only present at the two end regions of the embossment and the middle region of the embossment. In another example, adhesive may be applied to a dot embossment wherein the adhesive is only present in a central portion of the dot embossment. Further, the adhesive may be delivered from the permeable roll at any rate. For example, an adhesive may be forced through the holes of the permeable roll by a positive displacement pump, such as a Seepex positive displacement pump, and/or pressure regulation at a rate of 0.013 $g/m^2$ in the fibrous structure or about 0.003 g/minute/hole when operating a fibrous structure application speed of about 2000 feet per minute.

The permeable roll may be made by any suitable materials. Non-limiting examples of suitable materials for the permeable roll include steel, aluminum, other metals, carbon composite materials, plastics, natural rubber, synthetic rubber and/or other materials that provide a relatively rigid surface comprising holes for application flow.

The permeable roll may be fabricated as a single unit or may comprise sleeve sections (both in the circumferential and cross machine directions) that combine to form the permeable roll.

Test Method

Unless otherwise indicated, all tests described herein including those described under the Definitions section and the following test methods are conducted on samples, test equipment and test surfaces that have been conditioned in a conditioned room at a temperature of 73° F.±4° F. (about 23° C.±2.2° C.) and a relative humidity of 50%±10% for 12 hours prior to the test. Further, all tests are conducted in such conditioned room.

Plybond Strength Test Method

The plybond strength (dry plybond strength for purposes of the present invention) of a multi-ply fibrous structure is measured using a tensile tester. Strips of 7.62 cm wide (3 inch wide) of four samples of a multi-ply fibrous structure running the entire length, but no longer than about 28 cm (about 11 inches) of the samples is cut from the center of each sample. Two of the strips are cut in the machine direction and the other two are cut in the cross machine direction (i.e., between perforations in the machine direction or between edges in the cross machine direction). If the fibrous structure is in roll form, cut the samples from greater than 40" (1016 mm) from the ends of the roll. The plies of each strip are initially separated from one another about 50 mm (2 inches) along either of the 7.62 cm wide edges, so that each ply is available independent of the other and each ply has a gauge length of 5.08 cm (2 inches). Each ply of a strip is placed in a jaw (grip) of a tensile tester. A suitable tensile tester is an EJA Vantage tensile tester available from Thwing-Albert Instrument Company, West Berlin, N.J. The sample strip needs to be centered in the grips and straight. The crosshead separation speed is set at 20 inches per minute, the test distance is set at 6.5 inches, the load cell is 5000 g and the load divider is set at 3. Activate the tensile tester. When the test is complete, record the load mean value in g/in. Remove the sample strip from the grips and discard. Check the load cell for a zero reading. Repeat the process for each sample strip. Four samples are tested in tension. The four plybond strength numbers are then averaged to give an average plybond strength value in g/in units.

Care must be taken that the portion of the sample yet to be separated by the tensile machine does not contact the lower jaw or the lower crosshead of the tensile machine. If such contact occurs, it will register on the load cell and give a reading which is erroneously high. Similarly, care must be taken that the portion of the sample yet to be separated does not contact the portion of the sample having the plies already separated by the tensile tester. If such contact occurs, it will falsely increase the apparent ply bond strength. If either of the aforementioned contacts occur, the data point is to be discarded and a new sample tested.

Do not use samples that contain obvious defects, such as wrinkles, creases, tears, holes, etc.

Plybond Area Test Method

The plybond area test used to determine the % plybond area in a multi-ply fibrous structure is set forth below.

A 10.16 cm×10.16 cm (4 in.×4 in.) sample of a multi-ply fibrous structure is prepared. The sample is place on a flat surface. Using a Preval Sprayer (net wt. 2.0 oz) sprayer, available from Precision Valve Corporation, Yonkers, N.Y., an indicator solution is sprayed evenly onto the sample until the indicator solution just wets and penetrates the entire sample (each ply of the sample). If the multi-ply fibrous structure is bonded with an adhesive, a color, such as the color blue, will become noticeable. The indicator solution is made as follows:

1. 0.635 g Iodine crystals and 2.00 g Potassium Iodide are mixed in a 50 ml volumetric flask and diluted with distilled water to the 50 ml mark on the flask. The solution is mixed until the Iodine crystals and Potassium Iodide have dissolved in the distilled water forming a 0.1N Iodine solution. Set the solution aside.

2. 20.00 g Boric Acid is added to a 500 ml volumetric flask and diluted with distilled water to the 500 ml mark on the flask. The solution is mixed until the Boric Acid has dissolved in the distilled water making a 4% Boric Acid solution. Set the solution aside.

3. Transfer 50 ml of 0.1N Iodine solution from 1 above into a 1000 ml volumetric flask. Rinse the Iodine solution flask with distilled water and add to the 1000 ml volumetric flask for full transfer. Add 400 ml of the 4% Boric Acid solution to the 1000 ml volumetric flask by a graduated cylinder. Rinse the graduated cylinder into the 1000 ml volumetric flask with distilled water. Finally, dilute the contents of the 1000 ml volumetric flask to the 1000 ml mark on the flask with distilled water and mix to form the indicator solution to be sprayed on the sample.

Place the wetted sample entirely between two (2) 0.5 cm thick clear (not frosted or textured) glass plates to provide flatness to the sample.

Place a Kaiser RS3 Light stand available from B&H Photo, New York, N.Y., with two Sylvania NU B1 Super Flood BCA bulbs so that the sample is illuminated from the top and side of the sample. Minimize the other lighting to provide the most contrast resulting from the bulbs on the light stand. A Spot Insight Color Camera available from Diagnostic Instruments, Inc., Sterling Heights, Mich., with a Funion-TV 1:1.4/12/5 camera lens available from Fuji Photo Optical Company, Japan, is positioned to take a photo perpendicular to the top of the sample. The photo of the top of the sample is then analyzed by imaging software either Optimas v 6.51 or ImagePro, both available from Media Cybernetics, Inc., Bethesda, Md.

The color band for analysis via the imaging software is selected for the best contrast for the sample. Images are preprocessed to correct for small variations in lighting by using a local smoothing background correction filter of 30×30 pixels prior to thresholding. The corrected single color band image is thresholded to select only areas of glue. The % plybond area of the multi-ply fibrous structure is obtained from the percent area function of the imaging software.

Embossment Height Test Method

Embossment height is measured using a GFM Primos Optical Profiler instrument commercially available from GFMesstechnik GmbH, Warthestraβe 21, D14513 Teltow/Berlin, Germany. The GFM Primos Optical Profiler instrument includes a compact optical measuring sensor based on the digital micro mirror projection, consisting of the following main components: a) DMD projector with 1024×768 direct digital controlled micro mirrors, b) CCD camera with high resolution (1300×1000 pixels), c) projection optics adapted to a measuring area of at least 27×22 mm, and d) recording optics adapted to a measuring area of at least 27×22 mm; a table tripod based on a small hard stone plate; a cold light source; a measuring, control, and evaluation computer; measuring, control, and evaluation software ODSCAD 4.0, English version; and adjusting probes for lateral (x-y) and vertical (z) calibration.

The GFM Primos Optical Profiler system measures the surface height of a sample using the digital micro-mirror pattern projection technique. The result of the analysis is a map of surface height (z) vs. xy displacement. The system has a field of view of 27×22 mm with a resolution of 21 microns. The height resolution should be set to between 0.10 and 1.00 micron. The height range is 64,000 times the resolution.

To measure a fibrous structure sample do the following:

1. Turn on the cold light source. The settings on the cold light source should be 4 and C, which should give a reading of 3000K on the display;

2. Turn on the computer, monitor and printer and open the ODSCAD 4.0 Primos Software.

3. Select "Start Measurement" icon from the Primos taskbar and then click the "Live Pic" button.

4. Place a 30 mm by 30 mm sample of fibrous structure product conditioned at a temperature of 73° F.±2° F. (about 23° C.±1° C.) and a relative humidity of 50%±2% under the projection head and adjust the distance for best focus.

5. Click the "Pattern" button repeatedly to project one of several focusing patterns to aid in achieving the best focus (the software cross hair should align with the projected cross hair when optimal focus is achieved). Position the projection head to be normal to the sample surface.

6. Adjust image brightness by changing the aperture on the lens through the hole in the side of the projector head and/or altering the camera "gain" setting on the screen. Do not set the gain higher than 7 to control the amount of electronic noise. When the illumination is optimum, the red circle at bottom of the screen labeled "I.O." will turn green.

7. Select Technical Surface/Rough measurement type.

8. Click on the "Measure" button. This will freeze on the live image on the screen and, simultaneously, the image will be captured and digitized. It is important to keep the sample still during this time to avoid blurring of the captured image. The image will be captured in approximately 20 seconds.

9. If the image is satisfactory, save the image to a computer file with ".omc" extension. This will also save the camera image file ".kam".
10. To move the date into the analysis portion of the software, click on the clipboard/man icon.
11. Now, click on the icon "Draw Cutting Lines". Make sure active line is set to line 1. Move the cross hairs to the lowest point on the left side of the computer screen image and click the mouse. Then move the cross hairs to the lowest point on the right side of the computer screen image on the current line and click the mouse. Now click on "Align" by marked points icon. Now click the mouse on the lowest point on this line, and then click the mouse on the highest point on this line. Click the "Vertical" distance icon. Record the distance measurement. Now increase the active line to the next line, and repeat the previous steps, do this until all lines have been measured (six (6) lines in total. Take the average of all recorded numbers, and if the units is not micrometers, convert it to micrometers (μm). This number is the embossment height. Repeat this procedure for another image in the fibrous structure product sample and take the average of the embossment heights.

Maximum Unbonded Area Test Method

The maximum span of an unbonded region between embossments is determined by the following:
1. Determine the location of adhesive within a fibrous structure. This can be done by spraying a fine mist of a fluid which reacts with the adhesive. For example, a solution of boric acid and water will react with polyvinyl alcohol adhesives and the adhesive will turn a darker color than the surrounding fibrous structure where adhesive is not present. Alternatively, a thin metal tool can be inserted between the plies of the fibrous structure and moved parallel within the plies until a plybonded region is detected.
2. Mark all locations where adhesive is detected with a small amount of ink in the center of the adhesive region (a typical ball point pen works well).
3. Repeat the procedure described in steps 1 and 2 above across the entire surface of ten adjacent sheets within the convolutedly wound roll.
4. Cut a rectangle 51 mm in length and 22 mm in width from a sheet of transparent film. Transparency Film for Copiers from 3M Corporation may be used.
5. Position the rectangle of transparent film such that one of the 51 mm long edges of the rectangle is on the bottom and aligned with the transverse lines of weakness separating the adjacent sheets containing the regions of marked adhesive and one of the 22 mm long sides of the film rectangle is aligned with the left edge of the sheet.
6. Check if any adhesive location lies underneath and within the rectangle area.
7. Slowly move the transparent film rectangle across the sheet, keeping the bottom edge of the film rectangle aligned with the transverse line of weakness, until the right edge of the film rectangle meets the right edge of the sheet, checking along the way if adhesive lies underneath and within the rectangle area.
8. Index the rectangle film away from the transverse lines of weakness approximately 5 mm.
9. Slowly move the transparent film rectangle across the sheet, keeping the bottom edge of the film rectangle parallel with the transverse line of weakness and the same distance away from the transverse line of weakness, until the right edge of the film rectangle meets the right edge of the sheet, checking along the way if adhesive lies underneath and within the rectangle area.
10. Repeat steps 8 and 9 above until the entire surface of the ten adjacent sheets marked in step 3 above have been checked. Note if there are any regions in the fibrous structure that do not contain adhesive underneath and within the film rectangle.
11. Position the rectangle of transparent film such that one of the 22 mm long edges of the rectangle is on the bottom and aligned with the transverse lines of weakness separating the adjacent sheets containing the regions of marked adhesive and one of the 51 mm long sides of the film rectangle is aligned with the left edge of the sheet.
12. Check if any adhesive location lies underneath and within the rectangle area.
13. Slowly move the transparent film rectangle across the sheet, keeping the bottom edge of the film rectangle aligned with the transverse line of weakness, until the right edge of the film rectangle meets the right edge of the sheet, checking along the way if adhesive lies underneath and within the rectangle area.
14. Index the rectangle film away from the transverse lines of weakness approximately 5 mm.
15. Slowly move the transparent film rectangle across the sheet, keeping the bottom edge of the film rectangle parallel with the transverse line of weakness and the same distance away from the transverse line of weakness, until the right edge of the film rectangle meets the right edge of the sheet, checking along the way if adhesive lies underneath and within the rectangle area.
16. Repeat steps 14 and 15 above until the entire surface of the ten adjacent sheets marked in step 3 above have been checked. Note if there are any regions in the fibrous structure that do not contain adhesive underneath and within the film rectangle.

Maximum Span Test Method

The maximum span of an unbonded region within an embossment is determined by the following:
1. Determine the location of adhesive within a fibrous structure. This can be done by spraying a fine mist of a fluid which reacts with the adhesive. For example, a solution of boric acid and water will react with polyvinyl alcohol adhesives and the adhesive will turn a darker color than the surrounding fibrous structure where adhesive is not present. Alternatively, a thin metal tool can be inserted between the plies of the fibrous structure and moved parallel within the plies until a plybonded region is detected.
2. Mark all locations where adhesive is detected with a small amount of ink in the center of the adhesive region (a typical ball point pen works well).
3. Repeat the procedure described in steps 1 and 2 above across the entire surface of ten adjacent sheets within the convolutedly wound roll.
4. Measure and record the distances between adhesive regions within embossments by tracing along the longitudinal axis of each embossment with a PlanWheel SA2 from Scalex Corporation, 1915 Aston Ave, Carlsbad, Calif.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making an embossed multi-ply fibrous structure, the method comprises the steps of:
  a. providing a first ply of an embossed fibrous structure comprising at least one embossment;
  b. providing a second ply of a fibrous structure;
  c. applying an adhesive to at least one of the plies; and
  d. adhesively bonding the two plies together in a face-to-face relationship such that an embossed multi-ply fibrous structure comprising 10% or less total embossed area, wherein two or more plies of the embossed multi-ply fibrous structure are adhesively bonded together in a face-to-face relationship, is produced,
  wherein the embossed multi-ply fibrous structure comprises multiple line element embossments, at least one line element embossment having at least one discrete region that is void of adhesive and at least one line element embossment comprising at least one discrete region of adhesive that covers less than the entire surface area of the line element embossments, and wherein at least 50% of the multiple line element embossments have a length greater than 5 mm.

2. The method according to claim 1 wherein the maximum unbonded area is oriented in the machine direction.

3. The method according to claim 1 wherein the maximum unbonded area is oriented in the cross machine direction.

4. The method according to claim 1 wherein the maximum unbonded area is located immediately adjacent to an edge of the embossed multi-ply fibrous structure.

5. The method according to claim 1 wherein the embossed multi-ply fibrous structure comprises one or more transverse lines of weakness.

6. The method according to claim 5 wherein the maximum unbonded area is located immediately adjacent to at least one of the transverse lines of weakness.

7. The method according to claim 1 wherein the discrete region of adhesive is positioned between the line element embossment's termini.

8. The method according to claim 1 wherein the line element embossment comprises two discrete regions of adhesive that are positioned at the line element embossment's termini.

9. The method according to claim 8 wherein the line element embossment comprises at least one discrete region of adhesive positioned between the two discrete regions of adhesive.

10. The method according to claim 1 wherein the line element embossment comprises at least two discrete regions of adhesive.

11. The method according to claim 10 wherein the two discrete regions of adhesive are spaced 10 mm or less apart from each other.

12. The method according to claim 1 wherein the embossed multi-ply fibrous structure comprises at least one dot embossment.

13. The method according to claim 12 wherein the dot embossment comprises at least one discrete region of adhesive that covers less that the entire surface area of the dot embossment.

14. The method according to claim 1 wherein at least 0.2% of the total embossed area comprises line element embossments and at least 0.2% of the total embossed area comprises dot embossments.

15. The method according to claim 14 wherein the ratio of line element embossment area to dot embossment area is greater than 1.

16. The method according to claim 1 wherein the fibrous structure is in the form of a convolutely wound roll comprising transverse lines of weakness that segment the fibrous structure into separable units.

17. The method according to claim 1 wherein the embossed multi-ply fibrous structure exhibits a ratio of plybond strength to plybond area of the embossed multi-ply fibrous structure of greater than 100 g/in/% plybond area.

* * * * *